United States Patent
Zhamu et al.

(10) Patent No.: US 11,923,526 B2
(45) Date of Patent: Mar. 5, 2024

(54) PROCESS FOR PRODUCING GRAPHENE-PROTECTED METAL FOIL CURRENT COLLECTOR FOR A BATTERY OR SUPERCAPACITOR

(71) Applicant: Global Graphene Group, Inc., Dayton, OH (US)

(72) Inventors: Aruna Zhamu, Springboro, OH (US); Yanbo Wang, Miamisburg, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 28 days.

(21) Appl. No.: 16/871,390

(22) Filed: May 11, 2020

(65) Prior Publication Data
US 2021/0351391 A1    Nov. 11, 2021

(51) Int. Cl.
  *H01M 4/04* (2006.01)
  *H01M 4/66* (2006.01)

(52) U.S. Cl.
  CPC ......... *H01M 4/0404* (2013.01); *H01M 4/661* (2013.01); *H01M 4/663* (2013.01)

(58) Field of Classification Search
  None
  See application file for complete search history.

(56) References Cited

U.S. PATENT DOCUMENTS

| | | |
|---|---|---|
| 7,071,258 B1 | 7/2006 | Jang et al. |
| 11,063,248 B2 * | 7/2021 | Xiao .................. H01M 4/134 |
| 2005/0271574 A1 | 12/2005 | Jang et al. |
| 2008/0048152 A1 | 2/2008 | Jang et al. |
| 2012/0141864 A1 | 6/2012 | Juzkow et al. |
| 2013/0095389 A1 | 4/2013 | Bhardwaj et al. |
| 2013/0306361 A1 | 11/2013 | Kim et al. |
| 2013/0319870 A1 | 12/2013 | Chen et al. |
| 2014/0030636 A1 * | 1/2014 | Zhao .................. H01M 4/667 429/521 |
| 2014/0127488 A1 | 5/2014 | Zhamu et al. |
| 2015/0086881 A1 | 3/2015 | Zhamu et al. |
| 2015/0111449 A1 | 4/2015 | Cruz-Silva et al. |

(Continued)

FOREIGN PATENT DOCUMENTS

| | | |
|---|---|---|
| CN | 104600320 A | 5/2015 |
| KR | 101661224 B1 * | 9/2016 |
| WO | 2012151880 A1 | 11/2012 |

OTHER PUBLICATIONS

CN104600320 English language translation, May 6, 2015.

(Continued)

*Primary Examiner* — Tracy M Dove

(57) ABSTRACT

Provided is a process for producing a thin film graphene-bonded metal foil current collector for a battery or supercapacitor, said process comprising: (a) providing a graphene suspension comprising graphene sheets dispersed in a liquid medium; (b) operating a micro-gravure coater to deposit a layer of the graphene suspension onto at least one of the two primary surfaces of a metal foil to form a wet layer of graphene deposited thereon; and (c) removing said fluid medium from the deposited wet layer to form a dry layer of graphene, having a layer thickness from 1 nm to 100 nm. Optionally, the process may include heat treating the dry layer of graphene at a temperature from 35° C. to 3,000° C.

9 Claims, 8 Drawing Sheets

(56) References Cited

U.S. PATENT DOCUMENTS

2015/0287543 A1* 10/2015 Aksay .................. C01B 32/184
361/502
2017/0047588 A1 2/2017 Mukherjee et al.

OTHER PUBLICATIONS

CN104600320A—English language translation from Google Patent—https://patents.google.com/patent/CN104600320A/en, 6 pages, May 6, 2015.
Gwon et al., "Flexible energy storage devices based on graphene paper" Energy and Environmental Science (2011) vol. 4, pp. 1277-1283.
PCT/US17/18707 International Search Report and Written Opinion dated May 4, 2017, 14 pages.
Prabakar et al., "Graphene oxide as a corrosion inhibitor for the aluminum current collector in lithium ion batteries" Carbon (2013) vol. 52, pp. 128-136.
U.S. Appl. No. 15/231,486 Final Office Action dated Apr. 19, 2018, 15 pages.
U.S. Appl. No. 15/231,486 Nonfinal Office Action dated Jun. 21, 2019, 11 pages.
U.S. Appl. No. 15/231,486 Nonfinal Office Action dated Nov. 15, 2018, 17 pages.
U.S. Appl. No. 15/231,486 Nonfinal Office Action dated Oct. 20, 2017, 14 pages.
U.S. Appl. No. 15/231,486 Resp to Final Office Action dated Jul. 16, 2018, 13 pages.
U.S. Appl. No. 15/231,486 Resp to Nonfinal Office Action dated Feb. 1, 2018, 16 pages.
U.S. Appl. No. 15/231,498 Final Office Action dated Jun. 29, 2018, 21 pages.
U.S. Appl. No. 15/231,498 Nonfinal Office Action dated Mar. 21, 2018, 21 pages.
U.S. Appl. No. 15/231,498 Resp Final Office Action dated Aug. 29, 2018, 10 pages.
U.S. Appl. No. 15/231,498 Resp to Nonfinal Office Action dated May 24, 2018, 11 pages.
Wang et al., "Graphene-coated plastic film as current collector for lithium/sulfur batteries" J. Power Source (2013) vol. 239, pp. 623-627.
WO 2012151880A1—English language translation from Google Patent—https://patents.google.com/patent/WO2012151880A1/en, 15 pages, Nov. 15, 2012.
WO2012/151880 English language translation, Nov. 15, 2012.

* cited by examiner (Scale bar = 5 μm per interval)

PROCESS FOR PRODUCING GRAPHENE-PROTECTED METAL FOIL CURRENT COLLECTOR FOR A BATTERY OR SUPERCAPACITOR

The present disclosure provides a current collector for a lithium battery or supercapacitor. The current collector is a metal foil bonded with a thin graphene film. This graphene-protected thin metal foil is electrolyte-compatible, non-reactive, corrosion-protective, of low contact resistance, thermally and electrically conductive, ultra-thin, and light-weight, enabling a battery or capacitor to deliver a higher output voltage, higher energy density, high rate-capability, and much longer cycle life.

This patent application is primarily directed at a current collector that works with an anode electrode (anode active material layer) or a cathode electrode (cathode active material layer) of a lithium cell (e.g. lithium-ion cell, lithium-metal cell, or lithium-ion capacitor), a supercapacitor, a non-lithium battery (such as the zinc-air cell, nickel metal hydride battery, sodium-ion cell, and magnesium-ion cell), and other electrochemical energy storage cells, as compared to being directed at the anode active material layer or the cathode active material layer itself.

BACKGROUND

The lithium-metal cell includes the conventional lithium-metal rechargeable cell (e.g. using a lithium foil as the anode and $MnO_2$ particles as the cathode active material), lithium-air cell (Li-Air), lithium-sulfur cell (Li—S), and the emerging lithium-graphene cell (Li-graphene, using graphene sheets as a cathode active material), lithium-carbon nanotube cell (Li-CNT, using CNTs as a cathode), and lithium-nano carbon cell (Li—C, using nano carbon fibers or other nano carbon materials as a cathode). The anode and/or the cathode active material layer can contain some lithium, or can be prelithiated prior to or immediately after cell assembly.

Rechargeable lithium-ion (Li-ion), lithium metal, lithium-sulfur, and Li metal-air batteries are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than conventional lithium-ion batteries (having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries. Even now, cycling stability and safety concerns remain the primary factors preventing the further commercialization of Li metal batteries (e.g. Lithium-sulfur and Lithium-transition metal oxide cells) for EV, HEV, and microelectronic device applications.

Prompted by the aforementioned concerns over the safety of earlier lithium metal secondary batteries led to the development of lithium-ion secondary batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1 (with graphite specific capacity <372 mAh/g).

Although lithium-ion (Li-ion) batteries are promising energy storage devices for electric drive vehicles, state-of-the-art Li-ion batteries have yet to meet the cost, safety, and performance targets (such as high specific energy, high energy density, good cycle stability, and long cycle life). Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-170 mAh/g. As a result, the specific energy (gravimetric energy density) of commercially available Li-ion cells featuring a graphite anode and a lithium transition-metal oxide or phosphate based cathode is typically in the range from 120-220 Wh/kg, most typically 150-200 Wh/kg. The corresponding typical range of energy density (volumetric energy density) is from 300 to 400 Wh/L. These specific energy values are two to three times lower than what would be required in order for battery-powered electric vehicles to be widely accepted.

A typical battery cell is composed of an anode current collector, an anode electrode (also referred to as the anode active material layer, typically including an anode active material, a conductive filler, and a binder resin component), an electrolyte/separator, a cathode electrode (also referred to as the cathode active material layer, typically including a cathode active material, a conductive filler, and a binder resin), a cathode current collector, metal tabs that are connected to external wiring, and casing that wraps around all other components except for the tabs. The sum of the weights and the sum of the volumes of these components are the total cell weight and total cell volume, respectively. The total amount of energy stored by a cell is governed by the amount of cathode active material and the corresponding amount of anode active material. The specific energy and energy density of a cell is then defined as the total amount of energy stored by the total cell weight and cell volume, respectively. This implies that one way to maximize the specific energy and energy density of a cell is to maximize the amounts of active materials and to minimize the amounts of all other components (non-active materials), under the constraints of other battery design considerations.

In other words, the current collectors at the anode and the cathode in a battery cell are non-active materials, which must be reduced (in weight and volume) in order to increase the gravimetric and volumetric energy densities of the battery. Current collectors, typically aluminum foil (at the cathode) and copper foil (at the anode), account for about 15-20% by weight and 10-15% by cost of a lithium-ion battery. Therefore, thinner, lighter foils would be preferred.

However, there are several major issues associated with state-of-the-art current collectors:

(1) Due to easy creasing and tearing, thinner foils tend to be more expensive and harder to work with.
(2) Due to technical constraints, it is difficult, if not impossible, to fabricate metal foils thinner than 6 μm (e.g. Cu) or thinner than 12 μm (e.g. Al, Ni, stainless steel foil) in mass quantities.
(3) Current collectors must be electrochemically stable with respect to the cell components over the operating potential window of the electrode. In practice, continued corrosion of the current collectors mainly by the electrolyte can lead to a gradual increase in the internal resistance of the battery, resulting in persistent loss of the apparent capacity.
(4) Oxidation of metal current collectors is a strong exothermic reaction that can significantly contribute to thermal runaway of a lithium battery.

Accordingly, the current collectors are crucially important for cost, weight, safety, and performance of a battery. Instead of metals, graphene or graphene-coated solid metal or plastic has been considered as a potential current collector material, as summarized in the references listed below:

1. Li Wang, Xiangming He, Jianjun Li, Jian Gao, Mou Fang, Guangyu Tian, Jianlong Wang, Shoushan Fan, "Graphene-coated plastic film as current collector for lithium/sulfur batteries," J. Power Source, 239 (2013) 623-627.
2. S. J. Richard Prabakar, Yun-Hwa Hwang, Eun Gyoung Bae, Dong Kyu Lee, Myoungho Pyo, "Graphene oxide as a corrosion inhibitor for the aluminum current collector in lithium ion batteries," Carbon, 52 (2013) 128-136.
3. Yang Li, et al. Chinese Patent Pub. No. CN 104600320 A (2015 May 6).
4. Zhaoping Liu, et al (Ningbo Institute of Materials and Energy, China), WO 2012/151880 A1 (Nov. 15, 2012).
5. Gwon, H.; Kim, H-S; Lee, K E; Seo, D-H; Park, Y C; Lee, Y-S; Ahn, B T; Kang, K "Flexible energy storage devices based on graphene paper," *Energy and Environmental Science.* 4 (2011) 1277-1283.
6. Ramesh C. Bhardwaj and Richard M. Mank, "Graphene current collectors in batteries for portable electronic devices," US 20130095389 A1, Apr. 18, 2013.

Currently, graphene current collectors come in three different forms: graphene-coated substrate [Ref. 1-4], free-standing graphene paper [Ref. 5], and monolayer graphene film produced by transition metal (Ni, Cu)-catalyzed chemical vapor deposition (CVD) followed by metal etching [Ref. 6].

In the preparation of graphene-coated substrate, small isolated sheets or platelets of graphene oxide (GO) or reduced graphene oxide (RGO) are spray-deposited onto a solid substrate (e.g. plastic film or Al foil). In the graphene layer, the building blocks are separated graphene sheets/platelets (typically 0.5-5 μm in length/width and 0.34-30 nm in thickness) that are typically bonded by a binder resin, such as PVDF [Refs. 1, 3, and 4]. Although individual graphene sheets/platelets can have a relatively high electrical conductivity (within the confine of that 0.5-5 μm), the resulting graphene-binder resin composite layer is relatively poor in electrical conductivity (typically <100 S/cm and more typically <10 S/cm). Furthermore, another purpose of using a binder resin is to bond the graphene-binder composite layer to the substrate (e.g. Cu foil); this implies that there is a binder resin (adhesive) layer between Cu foil and the graphene-binder composite layer. Unfortunately, this binder resin layer is electrically insulating and the resulting detrimental effect seems to have been totally overlooked by prior workers.

Although Prabakar, et al. [Ref. 2] does not seem to have used a binder resin in forming an aluminum foil coated with discrete graphene oxide sheets, this graphene oxide-coated Al foil has its own problem. It is well-known in the art that aluminum oxide ($Al_2O_3$) readily forms on surfaces of an aluminum foil and cleaning with acetone or alcohol is not capable of removing this passivating layer of aluminum oxide or alumina. This aluminum oxide layer is not only electrically and thermally insulating, but actually is not resistant to certain types of electrolyte. For instance, the most commonly used lithium-ion battery electrolyte is $LiPF_6$ dissolved in an organic solvent. A trace amount of $H_2O$ in this electrolyte can trigger a series of chemical reactions that involve formation of HF (a highly corrosive acid) that readily breaks up the aluminum oxide layer and continues to corrode the Al foil and consume electrolyte. The capacity decay typically becomes much more apparent after 200-300 charge-discharge cycles.

Free-standing graphene paper is typically prepared by vacuum-assisted filtration of GO or RGO sheets/platelets suspended in water. In a free-standing paper, the building blocks are separated graphene sheets/platelets that are loosely overlapped together. Again, although individual graphene sheets/platelets can have a relatively high electrical conductivity (within the confine of that 0.5-5 μm), the resulting graphene paper has a very low electrical conductivity; e.g. 8,000 S/m or 80 S/cm [Ref. 5], which is 4 orders of magnitude lower than the conductivity of Cu foil ($8\times10^5$ S/cm).

The catalyzed CVD process involves introduction of a hydrocarbon gas into a vacuum chamber at a temperature of 500-800° C. Under these stringent conditions, the hydrocarbon gas gets decomposed with the decomposition reaction being catalyzed by the transition metal substrate (Ni or Cu). The Cu/Ni substrate is then chemically etched away using a strong acid, which is not an environmentally benign procedure. The whole process is slow, tedious, and energy-intensive, and the resulting graphene is typically a single layer graphene or few-layer graphene (up to 5 layers maximum since the underlying Cu/Ni layer loses its effectiveness as a catalyst).

Bhardwaj, et al [Ref. 6] suggested stacking multiple CVD-graphene films to a thickness of 1 μm or a few μm; however, this would require hundreds or thousands of films stacked together (each film being typically 0.34 nm to 2 nm thick). Although Bhardwaj, et al claimed that "The graphene may reduce the manufacturing cost and/or increase the energy density of a battery cell," no experimental data was presented to support their claim. Contrary to this claim, the CVD graphene is a notoriously expensive process and even a single-layer of CVD graphene film would be significantly more expensive than a sheet of Cu or Al foil given the same area (e.g. the same 5 cm×5 cm). A stack of hundreds or thousands of mono-layer or few-layer graphene films as suggested by Bhardwaj, et al would mean hundreds or thousands times more expensive than a Cu foil current collector. This cost would be prohibitively high. Further, the high contact resistance between hundreds of CVD graphene films in a stack and the relatively low conductivity of CVD graphene would lead to an overall high internal resistance, nullifying any potential benefit of using thinner films (1 μm of graphene stack vs. 10 μm of Cu foil) to reduce the overall cell weight and volume. It seems that the patent application of Bhardwaj, et al [Ref. 6], containing no data whatsoever, is nothing but a concept paper.

The above discussions have clearly shown that all three forms of the graphene-enhanced or graphene-based current collector do not meet the performance and cost requirements for use in a battery or supercapacitor. A strong need exists for a different type of material for use as a current collector.

SUMMARY

The present disclosure provides a process for producing a thin film graphene-bonded metal foil current collector for a battery or supercapacitor, the process comprising: (a) providing a graphene suspension comprising graphene sheets dispersed in a liquid medium; (b) operating a gravure or micro-gravure coater to deposit a layer of the graphene suspension onto at least one of the two primary surfaces of a metal foil to form a wet layer of graphene deposited thereon; and (c) totally or partially removing the fluid medium from the deposited wet layer to form a dry layer of graphene, having a layer thickness from 1 nm to 1000 nm (preferably from 2 nm to 100 nm, more preferably from 2 nm to 30 nm, and most preferably from 3 nm to 20 nm).

In certain embodiments, the process includes heat treating the dry layer of graphene at a temperature from 35° C. to 3,000° C.

In certain embodiments, the graphene sheets comprise sheets of a graphene material selected from pristine graphene (substantially oxygen-free; containing <0.01% by weight of O), graphene oxide (approximately 1%-50% by weight of O), reduced graphene oxide (approximately 0.01%-1.0%), graphene fluoride, graphene chloride, graphene bromide, graphene iodide, hydrogenated graphene, nitrogenated graphene, doped graphene, chemically functionalized graphene, or a combination thereof.

In certain embodiments, (b) includes depositing a layer of the graphene suspension on each of the two primary surfaces, wherein the metal foil preferably has a thickness from 1 μm to 30 μm.

Although there is no limitation on the type of metal that can be used in the instant current collector, the metal foil is preferably selected from Cu, Ti, Ni, stainless steel, Ti, or Al foil. The foil may be a metal foam structure having closed or open pores. The metal foil may be porous containing surface pores or interior pores.

In certain embodiments, the dry graphene layer comprises graphene oxide having an inter-plane spacing $d_{002}$ of 0.4 nm to 1.2 nm as determined by X-ray diffraction and an oxygen content no less than 20% by weight; and (c) includes heat treating the dry layer of graphene oxide to form said graphene oxide-bonded metal foil current collector at a heat treatment temperature from 50° C. to 2,500° C. to an extent that an inter-plane spacing $d_{002}$ is decreased to a value of from 0.335 nm to 0.5 nm and the oxygen content is decreased to less than 10% by weight and said thin film of graphene oxide has a thickness from 10 nm to 10 μm, a physical density from 1.3 to 2.2 g/cm$^3$, and all graphene oxide sheets being oriented substantially parallel to each other and parallel to said at least one primary surface.

Sub-process (b) may include forming a graphene oxide layer having an inter-plane spacing $d_{002}$ of 0.4 nm to 0.7 nm and an oxygen content no less than 20% by weight; and (c) includes heat-treating the graphene oxide layer to an extent that an inter-plane spacing $d_{002}$ is decreased to a value of from 0.3354 nm to 0.36 nm and the oxygen content is decreased to less than 2% by weight.

In some embodiments, the graphene suspension has a viscosity from 500 centipoise to 500,000 centipoise when measured at 20° C.

The graphene suspension may further comprise an adhesive and (c) comprises polymerizing, crosslinking, or activating the adhesive to produce chemical bonding between graphene sheets and the metal foil.

The adhesive resin, if present, may include a curing agent and a coupling agent along with the adhesive resin. Examples of the adhesive resin may include an ester resin, a urethane resin, a urethane ester resin, an acrylic resin, and an acrylic urethane resin, specifically ester resins including neopentyl glycol (NPG), ethylene glycol (EG), isophthalic acid, and terephthalic acid. The curing agent may be present in an amount of 1 to 30 parts by weight based on 100 parts by weight of the adhesive resin. The coupling agent may include epoxy silane compounds.

Curing of this adhesive layer may be conducted via heat, UV, or ionizing radiation. This can involve heating the layers coated with the heat-curable composition to a temperature of at least 70° C., preferably of 90° C. to 150° C., for at least 1 minute (typically up to 2 hours and more typically from 2 minutes to 30 minutes), so as to form a hard coating layer.

For thermally curable resins, the polyfunctional epoxy monomer may be selected preferably from diglycerol tetraglycidyl ether, dipentaerythritol tetraglycidyl ether, sorbitol polyglycidyl ether, polyglycerol polyglycidyl ether, pentaerythritol polyglycidyl ether (e.g. pentaerythritol tetraglycidyl ether), or a combination thereof. The bi- or tri-functional epoxy monomer can be selected from the group consisting of trimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures.

In certain embodiments, the heat-curable compositions of the present disclosure advantageously further contain small amounts, preferably from 0.05 to 0.20% by weight, of at least one surface active compound. The surface active agent is important for good wetting of the substrate resulting in satisfactory final hard-coating.

The UV radiation curable resins and lacquers usable for the adhesive layer useful in this disclosure are those derived from photo polymerizable monomers and oligomers, such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth) acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin.

The UV polymerizable monomers and oligomers are coated (e.g. after retreating from dipping) and dried, and subsequently exposed to UV radiation to form an optically clear cross-linked abrasion resistant layer. The preferred UV cure dosage is between 50 and 1000 mJ/cm$^2$.

UV-curable resins are typically ionizing radiation-curable as well. The ionizing radiation-curable resins may contain a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

The process is preferably a roll-to-roll process wherein (b) and (c) include feeding a sheet of the metal foil from a roller to a deposition zone, depositing a layer of graphene suspension onto the at least one primary surface of the metal foil to form a wet layer of graphene suspension thereon, drying the wet graphene layer to form a dried graphene layer deposited on said primary surface, and collecting dried graphene layer-deposited metal foil on a collector roller.

The thin metal foil (e.g. Cu foil, Al foil, stainless steel foil, Ni foil, and Ti foil) is preferably a free standing film (not supported on another piece of metal plate or plastic sheet, for instance) in order to reduce the film thickness and, thus, the length of pathways that electrons collected from or transferred to an electrode active material have to travel. The thin metal foil preferably has a thickness from 4 to 10 µm.

Preferably, both primary surfaces are each chemically bonded with a thin film of graphene sheets without using a binder or adhesive; wherein the thin film of graphene has a thickness from 2 nm to 1.0 µm (preferably less than 100 nm, further preferably less than 30 nm, most preferably less than 20 nm), an oxygen content from 0.1% to 10% by weight, an inter-graphene plane spacing of 0.335 to 0.50 nm, a physical density from 1.3 to 2.2 g/cm$^3$, all graphene sheets are oriented substantially parallel to each other and parallel to the primary surfaces, exhibiting a thermal conductivity greater than 500 W/mK and electrical conductivity greater than 1,500 S/cm when measured alone without the thin metal foil The thin metal foil is preferably selected from Cu, Ti, Ni, stainless steel, and chemically etched Al foil. Chemical etching is conducted on Al foil in such a manner that the surfaces of the chemically etched Al foil have no passivating Al$_2$O$_3$ film formed thereon prior to being bonded to the graphene sheets, particularly graphene oxide sheets.

We have also surprisingly observed that graphene oxide suspension (containing oxidized graphene sheets in an acidic medium having a pH value of 5.0 or lower, preferably and typically <3.0, and most typically <2.0) is capable of removing the passivating Al$_2$O$_3$ phase on Al foil surfaces. These GO sheets have an oxygen content typically >20% by wt., more typically >30% by wt., and most typically >40% by wt.

In certain embodiments, the current collector-protecting thin film of graphene oxide sheets has an oxygen content from 1% to 5% by weight. In certain other embodiments, the thin film of graphene oxide in the invented current collector has an oxygen content less than 1%, an inter-graphene spacing less than 0.345 nm, and an electrical conductivity no less than 3,000 S/cm. Preferably, in the disclosed current collector, the thin film of graphene oxide has an oxygen content less than 0.1%, an inter-graphene spacing less than 0.337 nm, and an electrical conductivity no less than 5,000 S/cm. Further preferably, the thin film of graphene oxide has an oxygen content no greater than 0.05%, an inter-graphene spacing less than 0.336 nm, a mosaic spread value no greater than 0.7, and an electrical conductivity no less than 8,000 S/cm.

In certain embodiments, the current collector-protecting thin film of graphene oxide has an inter-graphene spacing less than 0.336 nm, a mosaic spread value no greater than 0.4, and an electrical conductivity greater than 10,000 S/cm. In some of the invented current collectors, the thin film of graphene oxide exhibits an inter-graphene spacing less than 0.337 nm and a mosaic spread value less than 1.0. Preferably and typically, the thin film of graphene oxide exhibits a degree of graphitization no less than 80% and/or a mosaic spread value no greater than 0.4.

We have unexpectedly observed that a heat treatment temperature as low as 35° C. to 85° C. is capable of facilitating edge-to-edge merger of highly oriented GO sheets (chemical linking, extending of sheet-like molecules, or "polymerizing or chain-growing" of GO sheets or molecules that have been well-aligned by using a gravure or micro-gravure coater. Thus, in certain embodiments, the thin film of graphene oxide contains chemically bonded graphene molecules or chemically merged graphene planes that are parallel to one another.

In certain embodiments, the graphene oxide gel has a viscosity greater than 2,000 centipoise when measured at 20° C. prior to the shear-induced thinning and the viscosity is reduced to less than 2,000 centipoise during or after shear-induced thinning. Preferably, the graphene oxide gel has a viscosity from 500 centipoise to 500,000 centipoise when measured at 20° C. prior to shear-induced thinning. In some preferred embodiments, the graphene oxide gel has a viscosity no less than 5,000 centipoise when measured at 20° C. prior to shear-induced thinning, and the viscosity is reduced to less than 2,000 centipoise during or after shear-induced thinning. Typically, the graphene oxide gel has a viscosity that decreases by at least 10 times when a shear rate is increased at 20° C. The graphene oxide gel has a pH value less than 5.0, preferably <3.0, and more preferably <2.0. The shear-induced thinning may be conducted via a procedure selected from coating, casting, printing (e.g. inkjet printing, screen printing, etc.), air-assisted spraying, ultrasonic spraying, or extrusion. Preferably, (d) includes heat treating said graphene oxide layer under a compressive stress.

The graphene oxide gel may be prepared by immersing a graphitic material in a powder or fibrous form in an oxidizing liquid to form an initially optically opaque and dark suspension in a reaction vessel at a reaction temperature for a length of time sufficient to obtain a graphene oxide gel that is a homogeneous solution and also optically transparent, translucent, or brown-colored, wherein the graphene oxide gel is composed of graphene oxide molecules dissolved in an acidic medium having a pH value of no higher than 5 and the graphene oxide molecules have an oxygen content no less than 20% by weight. The graphitic material may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

The process can be a roll-to-roll process wherein (b) and (c) include feeding a sheet of said metal foil from a roller to a deposition zone, depositing a layer of graphene oxide gel onto the at least one primary surface of the metal foil to form a wet layer of graphene oxide gel thereon, drying the wet layer of graphene oxide gel to form a dried graphene oxide layer deposited on a primary surface, and collecting dried graphene oxide layer-deposited metal foil on a collector roller.

In certain embodiments, the heat treatment temperature contains a temperature in a thermal reduction regime of 80° C.-500° C. and the film of graphene oxide has an oxygen content less than 5%, an inter-graphene spacing less than 0.4 nm, and/or a thermal conductivity of at least 100 W/mK. In certain embodiments, the heat treatment temperature contains a temperature in the range from 500° C.-1,000° C. and the unitary graphene material has an oxygen content less than 1%, an inter-graphene spacing less than 0.345 nm, a thermal conductivity of at least 1,300 W/mK, and/or an electrical conductivity no less than 3,000 S/cm. In certain embodiments, the heat treatment temperature contains a temperature in the range from 1,000° C.-1,500° C. and the graphene oxide film has an oxygen content less than 0.01%, an inter-graphene spacing less than 0.337 nm, a thermal conductivity of at least 1,500 W/mK, and/or an electrical conductivity no less than 5,000 S/cm.

In certain embodiments, the graphene oxide film exhibits an inter-graphene spacing less than 0.337 nm and a mosaic spread value less than 1.0. In certain embodiments, the graphene oxide film exhibits a degree of graphitization no less than 40% and/or a mosaic spread value less than 0.7. In certain embodiments, the graphene oxide film exhibits a degree of graphitization no less than 80% and/or a mosaic spread value no greater than 0.4.

Typically, the graphene oxide film contains chemically bonded graphene molecules or chemically merged graphene planes that are parallel to one another.

In the presently presented process, the heat-treating induces chemical linking, merging, or chemical bonding of graphene oxide molecules, and/or re-graphitization or re-organization of a graphitic structure.

The process typically leads to a current collector-protecting graphene film having an electrical conductivity greater than 3,000 S/cm, a thermal conductivity greater than 600 W/mK, a physical density greater than 1.8 g/cm3, and/or a tensile strength greater than 40 MPa. More typically, the graphene film has an electrical conductivity greater than 5,000 S/cm, a thermal conductivity greater than 1,000 W/mK, a physical density greater than 1.9 g/cm3, and/or a tensile strength greater than 60 MPa. In many cases, the graphene oxide film has an electrical conductivity greater than 15,000 S/cm, a thermal conductivity greater than 1,500 W/mK, a physical density greater than 2.0 g/cm$^3$, and/or a tensile strength greater than 80 MPa.

Preferably, the thin film of graphene is a continuous length film having a length no less than 5 cm (preferably no less than 10 cm and further preferably no less than 20 cm) and a width no less than 1 cm (preferably no less than 10 cm). There are no practical limitations on the length and width of the continuous-length thin film of graphene herein disclosed.

In certain embodiments, the thin film of graphene, when measured alone, has a physical density greater than 1.8 g/cm3, and/or a tensile strength greater than 40 MPa; preferably having a physical density greater than 1.9 g/cm3, and/or a tensile strength greater than 60 MPa and more preferably having a physical density greater than 2.0 g/cm$^3$, and/or a tensile strength greater than 80 MPa.

In certain embodiments, (c) comprises a procedure of peeling off the dry layer of graphene prior to heat treating the dry layer of graphene at a temperature from 35° C. to 2,500° C. and a subsequent procedure of bonding the heat-treated graphene layer to a metal foil surface to produce a graphene-coated current collector.

The present disclosure also provides a rechargeable lithium battery or lithium-ion battery containing the presently invented current collector as an anode current collector and/or a cathode current collector. The rechargeable lithium battery may be a lithium-sulfur cell, a lithium-selenium cell, a lithium sulfur/selenium cell, a lithium-air cell, a lithium-graphene cell, or a lithium-carbon cell.

Also provided is a capacitor containing the invented current collector as an anode current collector or a cathode current collector, which capacitor is a symmetric ultracapacitor, an asymmetric ultracapacitor cell, a hybrid supercapacitor-battery cell, or a lithium-ion capacitor cell.

DETAILED DESCRIPTION OF PREFERRED EMBODIMENTS

Figure 1A:
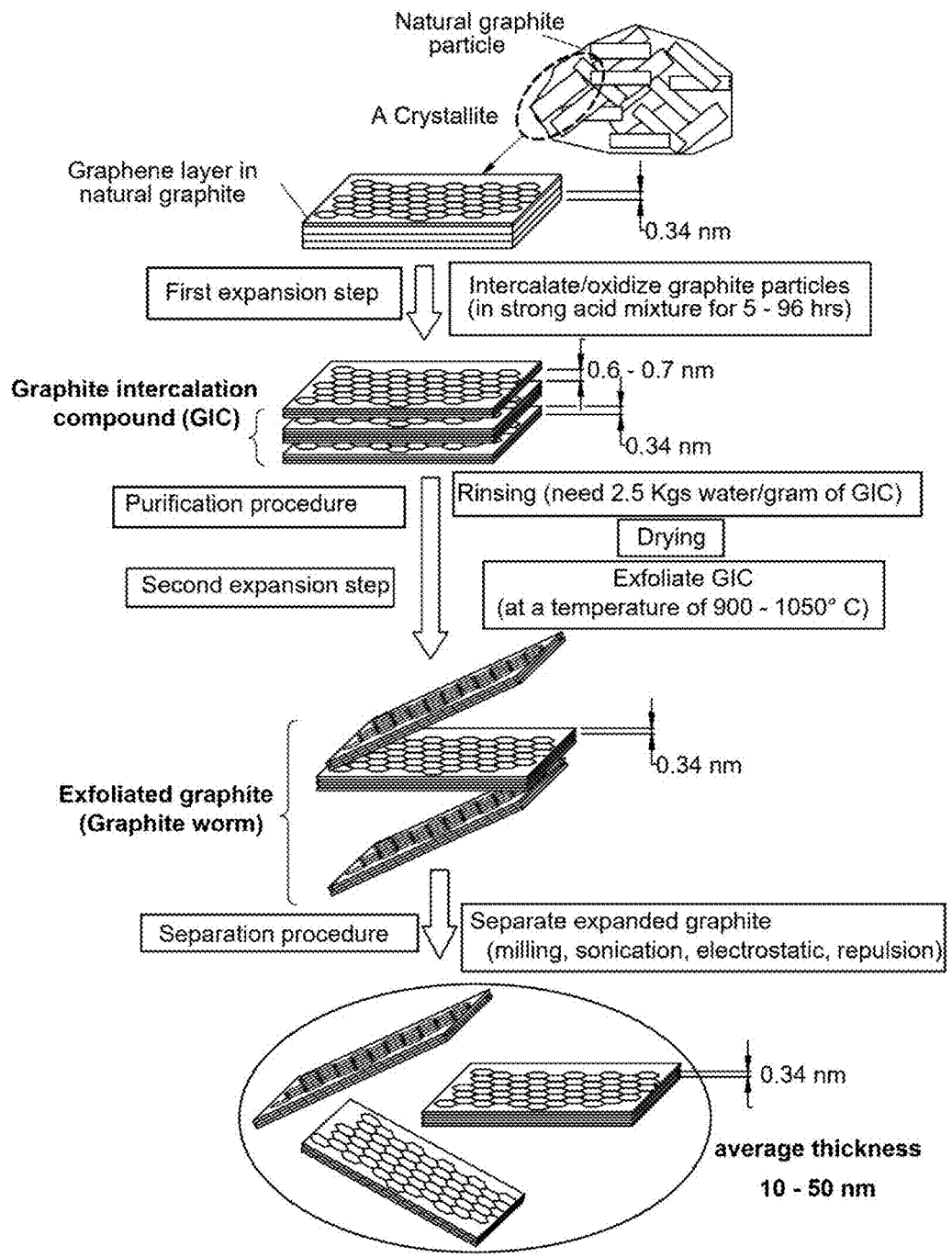
FIG. 1(A) Schematic drawing illustrating the commonly used process for producing graphene sheets. The process begins with intercalation and/or oxidation treatment of graphitic materials (e.g. natural graphite particles).
Figure 1B:
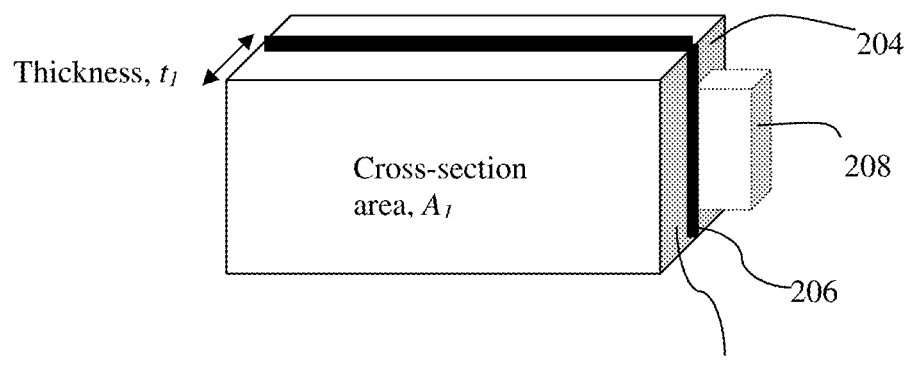
FIG. 1(B) Schematic drawing illustrating the prior art graphene-coated metal foil current collector, wherein a binder resin layer (or passivating aluminum oxide layer) is present between the graphene layer and the metal foil, such as Cu foil (or Al foil).
Figure 1C:
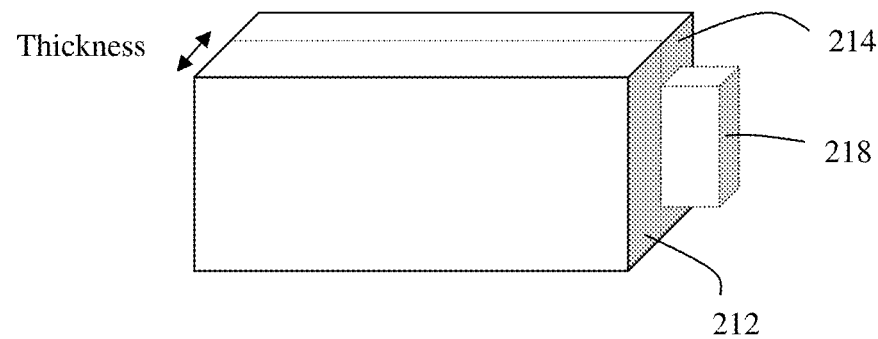
FIG. 1(C) Schematic drawing illustrating a preferred graphene-bonded metal foil current collector, wherein no binder resin layer or passivating aluminum oxide layer is present between the graphene oxide film and the Cu foil or Al foil.

The present disclosure provides a graphene-bonded metal foil thin-film current collector (e.g. as schematically shown in FIG. 1(C)) in a battery or supercapacitor. The current collector comprises: (a) a free-standing, non-supported thin metal foil (214 in FIG. 1(C)) having a thickness from 1 µm to 30 µm and two opposed but substantially parallel primary surfaces; and (b) a thin film 212 of graphene bonded to at least one of the two opposed primary surfaces without using a binder or adhesive. FIG. 1(C) only shows one primary surface of the metal foil 214 being bonded with a thin film 212 of graphene sheets. However, preferably, the opposite primary surface is also bonded with a thin film of graphene (not shown in FIG. 1(C)). As a terminal pole for electrically connecting to an external circuit, a metal tab 218 is typically welded or soldered to the metal foil 214.

As illustrated in FIG. 1(C), a preferred embodiment of the present disclosure is a graphene-bonded metal foil current collector, wherein no binder resin layer or passivating aluminum oxide layer is present between the graphene oxide film and the Cu foil or Al foil. In contrast, as schematically illustrated in FIG. 1(B), the prior art graphene-coated metal foil current collector typically and necessarily requires a binder resin layer between the graphene layer (a graphene-resin composite) and the metal foil (e.g. Cu foil). In the case of prior art graphene-coated Al foil [Prabakar et al.; Ref. 2], a passivating aluminum oxide (alumina) layer is naturally present between the graphene layer and the Al metal foil. This is due to the well-known fact that aluminum foil, upon fabrication and exposure to room air, always forms a passivating aluminum oxide layer on the surfaces of the Al foil. Simple cleaning by acetone or alcohol is incapable of removing this alumina layer. As will be demonstrated in later paragraphs, the presence of a layer of binder resin or aluminum oxide, even as thin as just 1 nm, has an enormous effect on increasing the contact resistance between the graphene layer and the metal foil. This surprising discovery by us has been totally overlooked by all prior art workers and, hence, prior art graphene-coated metal foils have not met the performance and cost requirements of a lithium battery or supercapacitor current collector.

The present disclosure provides a process for producing a thin film graphene-bonded metal foil current collector for a battery or supercapacitor, the process comprising: (a) providing a graphene suspension comprising graphene sheets dispersed in a liquid medium; (b) operating a gravure or micro-gravure coater to deposit a layer of the graphene suspension onto at least one of the two primary surfaces of a metal foil to form a wet layer of graphene deposited thereon; and (c) totally or partially removing the fluid medium from the deposited wet layer to form a dry layer of graphene, having a layer thickness from 1 nm to 100 nm (preferably from 2 nm to 50 nm, more preferably from 2 nm to 30 nm, and most preferably from 2 nm to 20 nm), and optionally heat treating the dry layer of graphene at a temperature from 35° C. to 2,500° C. In certain embodiments, (b) includes depositing a layer of the graphene suspension on each of the two primary surfaces. Preferably, the metal foil preferably has a thickness from 1 μm to 30 μm. The micro-gravure coater (sometimes referred to as a micro-gravure printer) is one of very few devices that are capable of coating nano materials to a thickness less than 20 nm, for instance.

Figure 2:
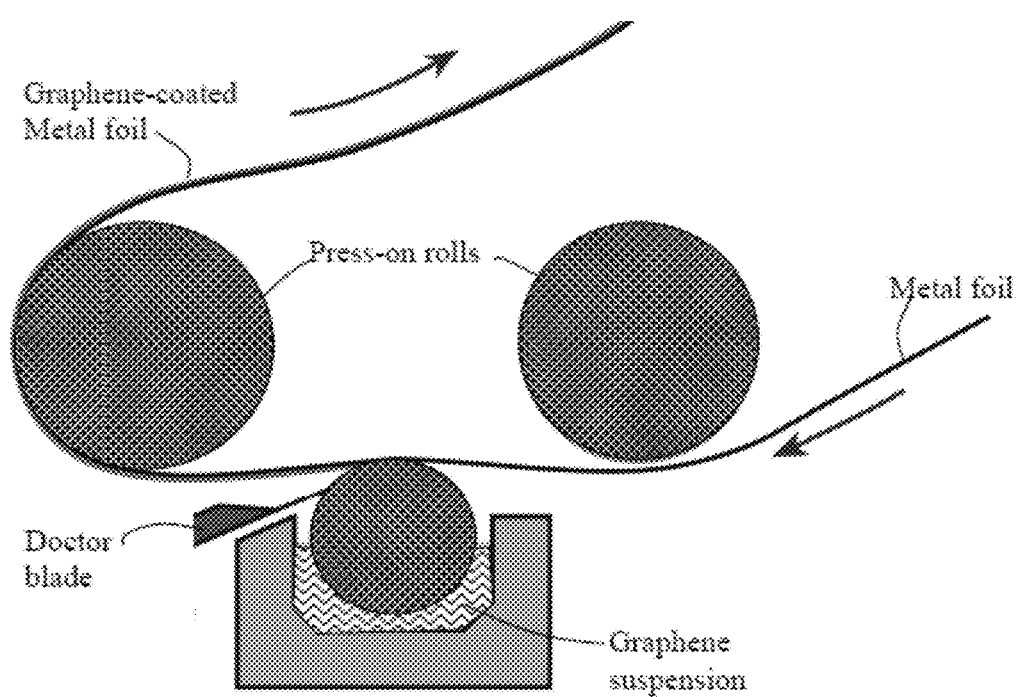
FIG. 2 Schematic of a micro-gravure apparatus, according to some embodiments of the present disclosure.

Compared to a gravure coater and other roll-to-roll coating systems, a micro-gravure coater (or printer) has a smaller diameter gravure roll engraved with patterns or cells to provide a specific coating volume. As schematically illustrated in FIG. 2, this coater or printer is used in a reverse kiss coating method in which the roll is partially submerged in a pan of solution or suspension. The roll rotates in the opposite direction of the web, and the cells pick up the coating solution or suspension. The flexible doctor blade can lightly smooth off the excess suspension and the precisely measured suspension in the cells is then transferred to the web.

The smaller diameter provides a much smaller contact area, which allows for a stable bead of suspension that is critical for thin and uniform coatings. The larger web-to-roller distance minimizes streaks and offers cleaner lines. No backing roll (no creasing) and smaller contact area are the features that can prevent spillover to the other side. Reverse coating creates shearing which results in a high degree of graphene sheet orientation, aligned along a desired direction.

In certain embodiments, the graphene sheets comprise sheets of a graphene material selected from pristine graphene (substantially oxygen-free; containing <0.01% by weight of O), graphene oxide (approximately 1%-50% by weight of O), reduced graphene oxide (approximately 0.01%-1.0%), graphene fluoride, graphene chloride, graphene bromide, graphene iodide, hydrogenated graphene, nitrogenated graphene, doped graphene, chemically functionalized graphene, or a combination thereof. We have also observed that the micro-gravure equipment is also capable of creating the required shear stress to align the graphene sheets of all kinds of graphene materials, including from pristine graphene, graphene oxide, reduced graphene oxide, graphene fluoride, graphene chloride, graphene bromide, graphene iodide, hydrogenated graphene, nitrogenated graphene, doped graphene, and chemically functionalized graphene.

A very significant and unexpected advantage of bringing graphene oxide sheets in direct contact with the primary surfaces of a Cu, Ni, or Ti foil is the notion that graphene oxide molecules can be well-bonded to these metal foils under the presently invented processing conditions, without using an external resin binder or adhesive (hence, no dramatically increased contact resistance). These processing conditions include well-aligning graphene oxide sheets on the metal foil surface and then heat-treating the two-layer structure at a temperature in the range from 80° C.-1,500° C. (more typically and desirably of 80° C.-500° C., and most typically and desirably of 80° C.-200° C.). Optionally, but not preferably, the heat treatment temperature can be as high as 3,000° C.

In the cases of aluminum foil-based current collectors or other metal surfaces having a tendency to form a passivating layer (typically metal oxide or metal hydroxide), the disclosed process preferably further include a procedure of chemically etching off the passivating layer (e.g. aluminum oxide layer) prior to being coated with or bonded by graphene sheets.

Alternatively, the graphene oxide may be prepared in a GO gel state, which is characterized by having high oxygen contents, reflecting high amounts of —OH and —COOH groups and having a pH value less than 5.0 (preferably <3.0 and even more preferably <2.0). The Al foil may be allowed to get immersed in a bath of GO gel, wherein the acidic environment naturally removes the passivating $Al_2O_3$ layer. When the Al foil emerges from the bath, GO molecules or sheets naturally adhere to the clean, etched Al foil surfaces, effectively preventing the exposure of Al foil surfaces to open air (hence, no passivating $Al_2O_3$ layer and no added contact resistance between an Al foil surface and the GO layer). This strategy has never been previously disclosed or suggested.

In addition to the chemical bonding power of the presently disclosed GO layer and the chemical etching power of the GO gel, the resulting thin film of graphene oxide in the presently disclosed graphene oxide-bonded metal foil has a thickness from 2 nm to 10 μm (preferably from 2 nm to 100 nm), an oxygen content from 0.1% to 10% by weight, an inter-graphene plane spacing of 0.335 to 0.50 nm, and a physical density from 1.3 to 2.2 g/cm³. All graphene oxide sheets on the metal foil are oriented substantially parallel to each other and parallel to the primary surfaces, enabling the protecting layer exhibiting a thermal conductivity greater than 500 W/mK, and/or electrical conductivity greater than 1,500 S/cm when measured alone without the thin metal foil. This thin film of graphene oxide is chemically inert and provides a highly effective protective layer against corrosion of the underlying metal foil.

Now, let us take a closer look at the magnitude of the total resistance (including the contact resistance) in a three-layer structure as illustrated in FIG. 1(B). The electrons in the graphene layer 202 (Layer 1) must move around in this layer, move across through the binder resin or passivating alumina layer 206 (Layer 2), and then move in the metal foil layer 204 (Layer 3) toward the terminal tab 208. For simplicity, we will consider only the total resistance against the electrons moving across the thickness of the graphene layer, the thickness of the binder/passivating layer, and the thickness of the metal foil layer. The electron movement in both the in-plane directions of graphene or metal foil is fast and of low resistance; hence, this resistance is neglected in the instant calculation.

that of alumina ($Al_2O_3$) are typically in the range from $10^3$-$10^5$ ohm-cm. Assume that $A_1=A_2=A_3=1$ cm², the thickness-direction resistivity pi of graphene layer=0.1 ohm-cm, the binder or alumina layer resistivity $\rho_2=1 \times 10^4$ ohm-cm and the metal foil layer resistivity is $\rho_3=1.7 \times 10^{-6}$ ohm-cm (Cu foil), or $\rho_3=2.7 \times 10^{-6}$ ohm-cm (Al foil). Also assume the optimum conditions where the Cu or Al foil thickness=6 μm, graphene layer thickness=1 μm, and the binder resin layer thickness is only 0.5 nm (actually it is from 5 nm to 100 nm). Then, the total resistance of the three-layer structure would be $5 \times 10^6$ ohm and the overall conductivity would be as low as $1.4 \times 10^{-10}$ S/cm (see first data row in Table 1 below). If we assume that the binder resin layer is 10 nm thick, the total resistance of the three-layer structure would be $1 \times 10$ ohm and the overall conductivity would be as low as $7.0 \times 10^{-12}$ S/cm (see 4th data row in Table 1 below). Such a 3-layer composite structure would not be a good current collector for a battery or supercapacitor since a high internal resistance would mean a low output voltage, lower power, and high amount of internal heat generated. Similar results are observed for Ni, Ti, and stainless steel foil-based current collectors (data rows 7-10 of Table 1).

TABLE 1

| metal | $\rho_1$ ohm-cm | $t_1$ $10^{-4}$ cm | $A_1$ cm² | $\rho_2$ ohm-cm | $t_2$ $10^{-4}$ cm | $A_2$ cm² | $\rho_3$ ohm-cm | $t_3$ $10^{-4}$ cm | $A_3$ cm² | R ohm | $\sigma = t/(AR)$ S/cm |
|---|---|---|---|---|---|---|---|---|---|---|---|
| Cu | 0.1 | 1 | 1 | 1.00E+14 | 0.0005 | 1 | 1.70E−06 | 6 | 1 | 5.00E+06 | 1.40E−10 |
| Cu | 0.1 | 1 | 1 | 1.00E+14 | 0.001 | 1 | 1.70E−06 | 6 | 1 | 1.00E+07 | 7.00E−11 |
| Cu | 0.1 | 1 | 1 | 1.00E+14 | 0.005 | 1 | 1.70E−06 | 6 | 1 | 5.00E+07 | 1.40E−11 |
| Cu | 0.1 | 1 | 1 | 1.00E+14 | 0.01 | 1 | 1.70E−06 | 6 | 1 | 1.00E+08 | 7.01E−12 |
| Cu | 0.1 | 1 | 1 | 1.00E+14 | 0.001 | 1 | 1.70E−06 | 6 | 1 | 1.00E+07 | 7.00E−11 |
| Al | 0.1 | 1 | 1 | 1.00E+14 | 0.001 | 1 | 2.70E−06 | 6 | 1 | 1.00E+07 | 7.00E−11 |
| Ni | 0.1 | 1 | 1 | 1.00E+14 | 0.001 | 1 | 7.00E−06 | 6 | 1 | 1.00E+07 | 7.00E−11 |
| Ti | 0.1 | 1 | 1 | 1.00E+14 | 0.001 | 1 | 5.50E−05 | 6 | 1 | 1.00E+07 | 7.00E−11 |
| SS304 | 0.1 | 1 | 1 | 1.00E+14 | 0.001 | 1 | 7.20E−05 | 6 | 1 | 1.00E+07 | 7.00E−11 |

The thickness-direction resistance of a sheet/film of conductor is given by $R=(1/\sigma)(t/A)$, where A=cross-section (length×width) of the conductor, t=thickness of the conductor, $\sigma$=conductivity=$1/\varrho$, and $\varrho$=resistivity, a material constant. A graphene-coated current collector containing a binder or passivating metal oxide layer may be viewed as a three-layer structure (FIG. 1(B)) with the graphene film, interfacial binder resin layer (or passivating alumina layer), and metal foil layer electrically connected in series.

The total resistance is the sum of the resistance values of the three layers: $R=R_1+R_2+R_3=\rho_1(t_1/A_1)+\rho_2(t_2/A_2)+\rho_3(t_3/A_3)=(1/\sigma_1)(t_1/A_1)+(1/\sigma_2)(t_2/A_2)+(1/\sigma_3)(t_3/A_3)$, where $\rho$=resistivity, $\sigma$=conductivity, t=thickness, and A=area of a layer, and, approximately, $A_1=A_2=A_3$. Scanning electron microscopic examinations reveal that the binder resin or passivating alumina layers are typically 5-100 nm thick. The resistivity of most commonly used binder resin (PVDF) and In contrast, if there is no binder resin or alumina layer ($t_2=0$), as is the case of the presently invented current collector, the total resistance of a graphene-bonded Cu foil has a value of $1.0 \times 10^{-5}$ ohm (vs. $1.0 \times 10^{+7}$ ohm of a 3-layer structure containing a 1-μm binder resin layer). Please see Table 2 below. This represents a difference by 12 orders of magnitude (not 12-fold)! The conductivity would be $7.0 \times 10^{-1}$ S/cm for the instant 2-layer structure, in contrast to $7.0 \times 10^{-11}$ S/cm of the corresponding 3-layer structure. Again, the difference is by 12 orders of magnitude. Furthermore, we have discovered that the lithium batteries and supercapacitors featuring the presently invented graphene oxide-bonded metal foil current collectors always exhibit a higher voltage output, higher energy density, higher power density, more stable chare-discharge cycling response, and last longer without capacity decay or corrosion issues as compared to prior art graphene-based current collectors

TABLE 2

| metal | $\rho_1$ ohm-cm | $t_1$ $10^{-4}$ cm | $A_1$ cm² | $\rho_2$ ohm-cm | $t_2$ $10^{-4}$ cm | $A_2$ cm² | $\rho_3$ ohm-cm | $t_3$ $10^{-4}$ cm | $A_3$ cm² | R ohm | $\sigma = t/(AR)$ S/cm |
|---|---|---|---|---|---|---|---|---|---|---|---|
| Cu | 0.1 | 1 | 1 | 1.00E+14 | 0 | 1 | 1.70E−06 | 6 | 1 | 1.00E−05 | 7.00E+01 |
| Al | 0.1 | 1 | 1 | 1.00E+14 | 0 | 1 | 2.70E−06 | 6 | 1 | 1.00E−05 | 7.00E+01 |
| Ni | 0.1 | 1 | 1 | 1.00E+14 | 0 | 1 | 7.00E−06 | 6 | 1 | 1.00E−05 | 7.00E+01 |
| Ti | 0.1 | 1 | 1 | 1.00E+14 | 0 | 1 | 5.50E−05 | 6 | 1 | 1.00E−05 | 6.98E+01 |
| SS304 | 0.1 | 1 | 1 | 1.00E+14 | 0 | 1 | 7.20E−05 | 6 | 1 | 1.00E−05 | 6.97E+01 |

TABLE 2-continued

| metal | $\rho_1$ ohm-cm | $t_1$ $10^{-4}$ cm | $A_1$ cm$^2$ | $\rho_2$ ohm-cm | $t_2$ $10^{-4}$ cm | $A_2$ cm$^2$ | $\rho_3$ ohm-cm | $t_3$ $10^{-4}$ cm | $A_3$ cm$^2$ | R ohm | $\sigma =$ t/(AR) S/cm |
|---|---|---|---|---|---|---|---|---|---|---|---|
| Cu    | 0.1 | 1 | 1 | 1.00E+14 | 0 | 1 | 1.70E−06 | 12  | 1 | 1.00E−05 | 1.30E+02 |
| Al    | 0.1 | 1 | 1 | 1.00E+14 | 0 | 1 | 2.70E−06 | 12  | 1 | 1.00E−05 | 1.30E+02 |
| Ni    | 0.1 | 1 | 1 | 1.00E+14 | 0 | 1 | 7.00E−06 | 12  | 1 | 1.00E−05 | 1.30E+02 |
| Ti    | 0.1 | 1 | 1 | 1.00E+14 | 0 | 1 | 5.50E−05 | 12  | 1 | 1.01E−05 | 1.29E+02 |
| SS304 | 0.1 | 1 | 1 | 1.00E+14 | 0 | 1 | 7.20E−05 | 12  | 1 | 1.01E−05 | 1.29E+02 |
| Cu    | 0.1 | 5 | 1 | 1.00E+14 | 0 | 1 | 1.70E−06 | 100 | 1 | 5.00E−05 | 2.10E+02 |
| Al    | 0.1 | 5 | 1 | 1.00E+14 | 0 | 1 | 2.70E−06 | 100 | 1 | 5.00E−05 | 2.10E+02 |
| Ni    | 0.1 | 5 | 1 | 1.00E+14 | 0 | 1 | 7.00E−06 | 100 | 1 | 5.01E−05 | 2.10E+02 |
| Ti    | 0.1 | 5 | 1 | 1.00E+14 | 0 | 1 | 5.50E−05 | 100 | 1 | 5.06E−05 | 2.08E+02 |
| SS304 | 0.1 | 5 | 1 | 1.00E+14 | 0 | 1 | 7.20E−05 | 100 | 1 | 5.07E−05 | 2.07E+02 |

Since graphene sheets are an essential material in the presently disclosed graphene-enabled current collector, the production processes used to produce various different types of graphene sheets are herein briefly introduced and discussed.

Bulk natural flake graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

The constituent graphene planes (typically 30 nm-2 μm wide/long) of a graphite crystallite can be exfoliated and extracted or isolated from the graphite crystallite to obtain individual graphene sheets of carbon atoms provided the inter-planar van der Waals forces can be overcome. An isolated, individual graphene sheet of hexagonal carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nano material (a 2-D nano carbon) that is distinct from the 0-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Pat. Pub. No. 2005/0271574 now abandoned); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152 now abandoned).

A highly useful approach (FIG. 1(A)) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=\frac{1}{2} d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

It may be noted that if natural graphite powder is dispersed in an oxidant (e.g., a mixture of concentrated sulfuric acid and nitric acid or potassium permanganate) for a sufficient period of time one can obtain a GO material having an oxygen content greater than 30% by weight (preferably >35%), which can be formed into a GO gel state via water rinsing and mechanical shearing.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 4 hours to 5 days). The resulting graphite oxide particles are then rinsed with water several times to adjust the pH values to typically 2-5. The resulting suspension of graphite oxide particles dispersed in water is then subjected to ultrasonication to produce a dispersion of separate graphene oxide sheets dispersed in water. A small amount of reducing agent (e.g. $Na_4B$) may be added to obtain reduced graphene oxide (RGO) sheets.

In order to reduce the time required to produce a precursor solution or suspension, one may choose to oxidize the graphite to some extent for a shorter period of time (e.g., 30 minutes-4 hours) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. Either the already separated graphene sheets (after mechanical shearing) or the un-broken graphite worms or individual graphite flakes are then re-dispersed in water, acid, or organic solvent and ultrasonicated to obtain a graphene dispersion.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication to obtain a graphene dispersion.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature $T>31°$ C. and pressure $P>7.4$ MPa) and water (e.g., at $T>374°$ C. and $P>22.1$ MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce a graphene dispersion of separated graphene sheets (non-oxidized NGPs) dispersed in a liquid medium (e.g. water, alcohol, or organic solvent).

Graphene materials can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS). When the oxygen content of graphene oxide exceeds 30% by weight (more typically when >35%), the GO molecules dispersed or dissolved in water for a GO gel state.

The laminar graphite materials used in the prior art processes for the production of the GIC, graphite oxide, and subsequently made exfoliated graphite, flexible graphite sheets, and graphene platelets were, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly used in the graphene deposition of polymer component surfaces.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene can contain pristine or non-pristine graphene and the invented method allows for this flexibility. These graphene sheets all can be chemically functionalized.

In certain embodiments, the dry graphene layer comprises graphene oxide having an inter-plane spacing $d_{002}$ of 0.4 nm to 1.2 nm as determined by X-ray diffraction and an oxygen content no less than 20% by weight; and (c) includes heat treating the dry layer of graphene oxide to form said graphene oxide-bonded metal foil current collector at a heat treatment temperature from 50° C. to 2,500° C. to an extent that an inter-plane spacing $d_{002}$ is decreased to a value of from 0.335 nm to 0.5 nm and the oxygen content is decreased to less than 10% by weight and said thin film of graphene oxide has a thickness from 10 nm to 10 μm, a physical density from 1.3 to 2.2 g/cm³, and all graphene oxide sheets being oriented substantially parallel to each other and parallel to said at least one primary surface.

Sub-process (b) may include forming a graphene oxide layer having an inter-plane spacing $d_{002}$ of 0.4 nm to 0.7 nm and an oxygen content no less than 20% by weight; and (c) includes heat-treating the graphene oxide layer to an extent that an inter-plane spacing $d_{002}$ is decreased to a value of from 0.3354 nm to 0.36 nm and the oxygen content is decreased to less than 2% by weight.

The thin film of graphene obtained from heat-treating a graphene oxide gel at a heat treatment temperature contains chemically bonded graphene molecules. These planar aromatic molecules or graphene planes (hexagonal structured carbon atoms) are parallel to one another. The lateral dimensions (length or width) of these planes are huge, typically several times or even orders of magnitude larger than the maximum crystallite dimension (or maximum constituent graphene plane dimension) of the starting graphite particles. The thin film composed of many "giant graphene oxide domains" having all constituent graphene planes being essentially parallel to one another, having a thin layer of GO molecules chemically bonded to the underlying metal foil. This is a unique and new class of material that has not been previously discovered, developed, or suggested to possibly exist.

The graphene oxide gel is a very unique and novel class of material that surprisingly has great cohesion power (self-bonding, self-polymerizing, and self-crosslinking capability) and adhesive power (capable of chemically bonding to a wide variety of solid surfaces). These characteristics have not been taught or hinted in the prior art. The GO gel is obtained by immersing powders or filaments of a starting graphitic material in an oxidizing liquid medium (e.g. a mixture of sulfuric acid, nitric acid, and potassium permanganate) in a reaction vessel. The starting graphitic material may be selected from natural graphite, artificial graphite, meso-phase carbon, meso-phase pitch, meso-carbon microbead, soft carbon, hard carbon, coke, carbon fiber, carbon nano-fiber, carbon nano-tube, or a combination thereof.

When the starting graphite powders or filaments are mixed in the oxidizing liquid medium, the resulting slurry (heterogeneous suspension) initially appears completely dark and opaque. When the oxidation of graphite proceeds at a reaction temperature for a sufficient length of time under a controlled pH condition, the reacting mass can eventually become a homogeneous solution having no discernible or visually identifiable dispersed solid particle (as opposed to the initially heterogeneous suspension that contain identifiable solid particles). The solution can be optically translucent or transparent or brown-colored, which also looks and behaves like a polymer gel. This heavy oxidation-induced graphene oxide gel is composed of graphene oxide molecules dissolved in the liquid medium. The graphene oxide molecules, prior to any subsequent heat treatment, have an oxygen content no less than 20% by weight (typically from 30-50% by weight) and their molecular weights are typically less than 43,000 g/mole (often less than 4,000 g/mole, but typically greater than 200 g/mole) while in a gel state. The graphene oxide gel is composed of graphene oxide molecules dissolved in an acidic medium having a pH value of typically no higher than 5.0 (more typically <3.0 and most typically <2.0).

The graphene oxide gel has a typical viscosity from 500 centipoise (cP) to 500,000 cP when measured at 20° C. prior to shear-induced thinning. The viscosity is more typically greater than 2,000 cP and less than 300,000 cP when measured at 20° C. prior to the shear-induced thinning procedure. Preferably, the viscosity of the GO gel as a precursor to unitary graphene material is in the range from 2,000-50,000 cP. Preferably, the GO gel is subjected to a shear stress field that the viscosity is reduced to below 2,000 cP (or even below 1,000 cP) during or after shear-induced thinning. In an embodiment, the graphene oxide gel has a viscosity greater than 5,000 cP when measured at 20° C. prior to shear-induced thinning, but is reduced to below 5,000 cP (preferably and typically below 2,000 cP or even below 1,000 cP) during or after shear-induced thinning. The viscosity data measured at 20° C., shown in FIG. 8(A), FIG. 8(B), and FIG. 8(C) as an example, clearly indicate that even an ultra-high viscosity value (e.g., 300,000 cP) can be reduced down to 1,000-2,000 cP with a sufficiently high shear rate. This is a reduction by more than 2 orders of magnitude, a highly unexpected observation. The straight line of the data when plotted in a log-log scale indicates a shear thinning fluid flow behavior.

In (b), the GO gel is formed into a shape under the influence of a high shear stress enabled by a micro-gravure coater, as schematically illustrated in FIG. 2. The roller, "doctor's blade", or wiper creates a shear stress when the film is shaped, or when a relative motion is imposed between the roller/blade/wiper and the supporting substrate. Quite unexpectedly and significantly, such a shearing action reduces the effective viscosity of the GO gel and enables the planar graphene oxide (GO) molecules to well align along, for instance, a shearing direction. Further surprisingly, such a molecular alignment state or preferred orientation is not disrupted when the liquid components in the GO gel are subsequently removed to form a well-packed GO mass that is at least partially dried. The dried GO mass has a high birefringence coefficient between an in-plane direction and the normal-to-plane direction.

It may be noted that the micro-gravure equipment is herein found to be also capable of creating the required shear stress to align the graphene sheets of all kinds of graphene materials, including from pristine graphene, graphene oxide, reduced graphene oxide, graphene fluoride, graphene chloride, graphene bromide, graphene iodide, hydrogenated graphene, nitrogenated graphene, doped graphene, and chemically functionalized graphene in a liquid medium. The graphene sheets in all these types of graphene suspension, not just GO gel, can be highly aligned by a micro-gravure device.

This dried GO mass is then subjected to a properly programmed heat treatment. For a temperature range of 80° C.-500° C., the GO mass primarily undergoes chemical reactions with metal foil surfaces, sustains some chemical merging between GO molecules, and thermally reduces oxygen content from typically 30-50% (as dried) to 5-6%. This treatment results in a reduction of inter-graphene spacing from approximately 0.6-1.0 nm (as dried) to approximately 0.4 nm and an increase in in-plane thermal conductivity from approximately 100 W/mK to 500 W/mK and electrical conductivity from 800 S/cm to >2,000 S/cm. Even with such a low temperature range, some chemical linking occurs. The GO molecules remain well-aligned, but the inter-GO spacing remains relative large (0.4 nm or larger). Many O-containing functional groups survive.

For a heat treatment temperature range of 500° C.-1,500° C., extensive chemical combination, polymerization, and cross-linking between adjacent GO molecules occur. The oxygen content is reduced to typically <2.0% (more typically <1.0%), resulting in a reduction of inter-graphene spacing to approximately 0.345 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene film-bonded metal foil and its production processes. These chemical linking reactions result in an increase in in-plane thermal conductivity of a graphene thin film to 1,400-1,500 W/mK, and/or in-plane electrical conductivity to >5,000 S/cm.

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354\,g+0.344\,(1-g)$, where $d_{002}$ is the interlayer spacing of graphite or graphene crystal in nm. This equation is valid only when $d_{002}$ is equal or less than approximately 0.3440 nm. The graphene oxide film or lightly oxidized graphite crystalline material having a $d_{002}$ higher than 0.3440 nm reflects the presence of oxygen-containing functional groups (such as —OH, >O, and —COOH on graphene molecular plane surfaces) that act as a spacer to increase the inter-graphene spacing.

Another structural index that can be used to characterize the degree of ordering of the presently invented unitary graphene material and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials have a mosaic spread value in this range of 0.2-0.4 (with a heat treatment temperature no less than 2,000° C.). However, some values are in the range from 0.4-0.7 if the highest heat treatment temperature (TTT) is between 1,000 and 1,500° C., and in the range from 0.7-1.0 if the TTT is between 500 and 1,000° C.

The heat treatment temperature conditions for GO are such that the thin film of graphene oxide coated on a metal foil is relatively pore-free having a physical density of at least 1.5 g/cm$^3$ or a porosity level lower than 20%. Under more typical processing conditions, the thin film has a physical density of at least 1.7 g/cm$^3$ or a porosity level lower than 10%. In most cases, the film has a physical density greater than 1.8 g/cm$^3$ or a porosity level less than 5%. The chemically bonded graphene planes in the film typically contain a combination of sp$^2$ and sp$^3$ electronic configurations (particularly for those films prepared with the maximum treatment temperature lower than 1,500° C.).

The present disclosure also provides a rechargeable battery that contains a presently invented graphene thin film-bonded metal foil as an anode current collector and/or a cathode current collector. This can be any rechargeable battery, such as a zinc-air cell, a nickel metal hydride cell, a sodium-ion cell, a sodium metal cell, a magnesium-ion cell, or a magnesium metal cell, just to name a few. This invented battery can be a rechargeable lithium battery containing the unitary graphene layer as an anode current collector or a cathode current collector, which lithium battery can be a lithium-sulfur cell, a lithium-selenium cell, a lithium sulfur/selenium cell, a lithium-ion cell, a lithium-air cell, a lithium-graphene cell, or a lithium-carbon cell. Another embodiment of the disclosure is a capacitor containing the current collector of the present disclosure as an anode current collector or a cathode current collector, which capacitor is a symmetric ultracapacitor, an asymmetric ultracapacitor cell, a hybrid supercapacitor-battery cell, or a lithium-ion capacitor cell As an example, the present disclosure provides a rechargeable lithium-metal cell composed of a current collector at the anode, a lithium film or foil as the anode, a porous separator/electrolyte layer, a cathode containing a cathode active material (e.g. lithium-free $V_2O_5$ and $MnO_2$), and a current collector. Either or both the anode current collector and cathode current collector can be a graphene-based current collector of the present disclosure.

Another example of the present disclosure is a lithium-ion capacitor (or hybrid supercapacitor) composed of a current collector at the anode, a graphite or lithium titanate anode, a porous separator soaked with liquid or gel electrolyte, a cathode containing a cathode active material (e.g. activated carbon having a high specific surface area), and a current collector. Again, either or both the anode current collector and cathode current collector can be a graphene-based current collector of the present disclosure.

Yet another example of the present disclosure is another lithium-ion capacitor or hybrid supercapacitor, which is composed of a current collector at the anode, a graphite anode (and a sheet of lithium foil as part of the anode), a porous separator soaked with liquid electrolyte, a cathode containing a cathode active material (e.g. activated carbon having a high specific surface area), and a current collector. Again, either or both the anode current collector and cathode current collector can be a graphene-based current collector of the present disclosure.

Still another example of the present disclosure is a lithium-graphene cell composed of a current collector at the anode, a porous, nano-structured anode (e.g. comprising graphene sheets having high surface areas upon which returning lithium ions can deposit during cell recharge, which are mixed with surface-stabilized lithium powder particles, or having a sheet of lithium foil attached to the nano-structure), a porous separator soaked with liquid electrolyte, a cathode containing a graphene-based cathode active material (e.g. graphene, graphene oxide, or graphene fluoride sheets having high specific surface areas to capture lithium ions during cell discharge), and a cathode current collector. Again, either or both the anode current collector and cathode current collector can be a graphene-based current collector of the present disclosure.

Example 1: Preparation of Discrete Graphene Sheets (NGPs) and Graphene-Coated Metal Foils Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (graphite worms) were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin graphene sheets. Graphene sheets were mixed with a binder resin (PVDF) and then coated onto primary surfaces of Cu foil and Al foil to form graphene oxide-coated current collectors. Additionally, a sheet of Al foil was cleaned with acetone and then gravure-coated with both GO and RGO sheets. The resulting current collectors were evaluated in both lithium batteries and supercapacitors.

Example 2: Preparation of Graphene from Meso-Carbon Micro-Beads (MCMBs) and Graphene-Protected Metal Foil Meso-carbon microbeads (MCMBs) were supplied from China Steel Chemical Co. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 72 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 1,080° C. for 45 seconds to obtain a graphene material. TEM and atomic force microscopic studies indicate that most of the NGPs were single-layer graphene. These graphene sheets are deposited (along with a resin binder) onto a thin metal foil using a micro-gravure device. In the case of Al foil, samples of graphene-coated Al foil (no binder) were also prepared.

Example 3: Preparation of Pristine Graphene Sheets-Protected Current Collectors

In a typical procedure, five grams of graphite flakes, ground to approximately 20 m or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. These pristine graphene sheets were deposited (along with a resin binder) onto a thin metal foil using a micro-gravure device.

Example 4: Preparation of Graphene Fluoride Sheet-Protected Current Collectors Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions. The suspensions were then coated on PET film substrate surfaces using micro-gravure coating, dried, peeled off from the substrate, and heat treated at 500° C. for 3 hours and 2750° C. for 1 hour. After heat treatments, the films were sprayed with some rubber solution (e.g. ethylene oxide-epichlorohydrin copolymer dissolved in xylene), which was laminated with a stainless steel foil and then dried to form a graphite fluoride-protected stainless steel foil.

Example 5: Preparation of Nitrogenated Graphene Sheet-Based Bi-Polar Electrodes Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water. The resulting dispersion was gravure-coated on one or both primary surfaces of a roll of Al foil to produce graphene-coated Al current collectors.

Example 6: Functionalized Graphene-Coated Conductive Foils for Bi-Polar Electrodes Thermal films were prepared from several functionalized graphene-elastomer dispersions containing 5% by weight of functionalized graphene sheets (few-layer graphene) and 0.01% by weight of urethane oligomer (a mixture of di-isocyanate and polyol). Chemical functional groups involved in this study include an azide compound (2-Azidoethanol), alkyl silane, hydroxyl group, carboxyl group, amine group, sulfonate group ($-SO_3H$), and diethylenetriamine (DETA). These functionalized graphene sheets were supplied from Taiwan Graphene Co., Taipei, Taiwan. Upon coating of the dispersion onto two surfaces of Cu foil and stainless steel foil, removal of the liquid medium (acetone), compressed with a heated press and cured at 150° C. for 45 minutes, one obtained functionalized graphene-coated current collectors wherein graphene sheets were well bonded to urethane based adhesive.

Example 7: Preparation of Graphene Oxide (GO) Gel

Graphene oxide gel was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid, the suspension or slurry appears optically opaque and dark. The suspension remains opaque during the first 52 hours of reaction. However, the suspension gradually turns optically translucent (a little cloudy) when the reaction time exceeds 52 hours, and the color of the suspension changes from black to dark brown. After 96 hours, the suspension suddenly becomes an optically transparent solution with light brown color. The solution appears very uniform in color and transparency, indicating the absence of any dispersed discrete objects. The whole solution behaves like a gel, very similar to a typical polymer gel.

Surprisingly, by depositing this gel on a metal foil surface (Cu, Al, Ni, Ti, or stainless steel) and removing the liquid medium from the cast film we obtain a thin film of graphene oxide that is optically transparent. This thin film looks like, feels like, and behaves like a regular polymer film. However, upon heat treatments at a temperature (from 80° C. to 1,500° C.) for typically 1-3 hours, this GO film is transformed into a monolithic thin film entity comprising large-size graphene domains. This GO film is well bonded to the underlying metal foil.

X-ray diffraction curves of a GO film (GO gel coated on a glass surface with liquid medium removed) prior to a heat treatment, a GO film thermally reduced at 150° C. for one hour, and a highly reduced and re-graphitized GO film (a unitary graphene layer) were obtained. The peak at approximately $2\theta=12^\circ$ of the dried GO film corresponds to an inter-graphene spacing ($d_{002}$) of approximately 0.7 nm. With some heat treatment at 150° C., the GO film exhibits the formation of a hump centered at 22°, indicating that it has begun the process of decreasing the inter-graphene spacing, indicating the beginning of chemical linking and ordering processes. With a heat treatment temperature of 1,250° C. for 3 hours, the $d_{002}$ spacing has decreased to approximately 0.34, close to 0.3354 nm of a graphite single crystal.

With a heat treatment temperature of 1,500° C. for 3 hours, the $d_{002}$ spacing is decreased to approximately to 0.3354 nm, identical to that of a graphite single crystal. In addition, a second diffraction peak with a high intensity appears at $2\theta=55^\circ$ corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g. highly oriented pyrolytic graphite, HOPG) is in the range from 0.2-0.5. As an example, a polyimide-derived PG with a HTT of 3,000° C. for two hours exhibits a I(004)/I(002) ratio of about 0.41. In contrast, a thin film of GO bonded on a metal foil prepared with a HTT of 1,500° C. for 4 hours exhibits a I(004)/I(002) ratio of 0.78 and a Mosaic spread value of 0.21, indicating a practically perfect graphene single crystal with an exceptional degree of preferred orientation. There is a synergistic effect between the thin GO layer (<1 μm) prepared from GO gel and the underlying metal foil (Cu, Ni, Ti, and steel).

The "mosaic spread" value obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials have a mosaic spread value in this range of 0.2-0.4 (with a heat treatment temperature no less than 1,500° C.).

It may be noted that the I(004)/I(002) ratio for all tens of flexible graphite samples investigated are all <<0.05, practically non-existing in most cases. The I(004)/I(002) ratio for all graphene paper/membrane samples is <0.1 even after a heat treatment at 3,000° C. for 2 hours. Attempts to graphitize the ultra-thin films (<2 nm in thickness) prepared by Cu-catalyzed CVD led to the breaking up of the film and the formation of graphite particles instead. These observations have further confirmed or affirmed the already established notion that the presently invented GO film-bonded metal foil is a new and distinct class of material that is fundamental different from any pyrolytic graphite (PG), flexible graphite (FG), and paper/film/membrane of conventional graphene/GO/RGO sheets/platelets (NGPs) that are free-standing or coated on a metal foil.

It is of significance to point out that a heat treatment temperature as low as 500° C. is sufficient to bring the average inter-graphene spacing in GO to below 0.4 nm, getting closer and closer to that of natural graphite or that of a graphite single crystal. The beauty of this approach is the notion that this GO gel strategy has enabled us to re-organize, re-orient, and chemically merge the planar graphene oxide molecules from originally different graphite particles or graphene sheets into a graphene monolith with all the graphene planes now being larger in lateral dimensions (significantly larger than the length and width of original graphene planes) and essentially parallel to one another. This has given rise to a thermal conductivity already >420 W/mK (with a HTT of 500° C.) and >950 W/mk with a HTT of 700° C.), which is more than 2- to 4-fold greater than the value (200 W/mK) of the corresponding flexible graphite foil. These planar GO molecules are derived from the graphene planes that constitute the original structure of starting natural graphite particles (used in the procedure of graphite oxidation to form the GO gel). The original natural graphite particles, when randomly packed into an aggregate or "graphite compact", would have their constituent graphene planes randomly oriented, exhibiting relatively low thermal conductivity and having essentially zero strength (no structural integrity). In contrast, the strength of the unitary graphene layer (even without an added reinforcement) is typically already in the range from 40-140 MPa.

With a HTT as low as 800° C., the resulting unitary graphene layer exhibits a thermal conductivity of 1,148 W/mK, in contrast to the observed 244 W/mK of the flexible graphite foil with an identical heat treatment temperature. As a matter of fact, no matter how high the HTT is (e.g. even as high as 2,800° C.), the flexible graphite foil only shows a thermal conductivity lower than 600 W/mK. At a HTT of 2,800° C., the presently invented unitary graphene layer delivers a thermal conductivity of 1,807 W/mK even though the metal foil has been melted at such a high temperature.

Scanning electron microscopy (SEM), transmission electron microscopy (TEM) pictures of lattice imaging of the graphene layer, as well as selected-area electron diffraction (SAD), bright field (BF), and dark-field (DF) images were also conducted to characterize the structure of unitary graphene materials. For measurement of cross-sectional views of the film, the sample was buried in a polymer matrix, sliced using an ultra-microtome, and etched with Ar plasma.

Figure 3A:
FIG. 3(A) A SEM image of a GO film.
Figure 3A:
Figure 3B:
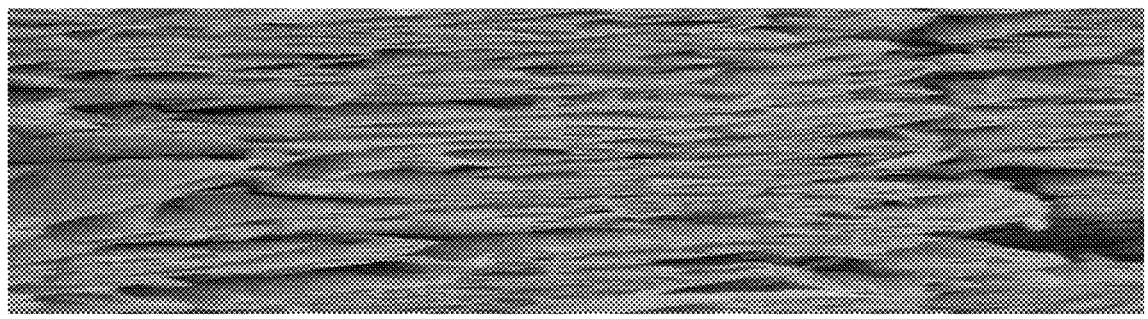
FIG. 3(B) A SEM image of graphene oxide paper.
Figure 3B:
Figure 3C:
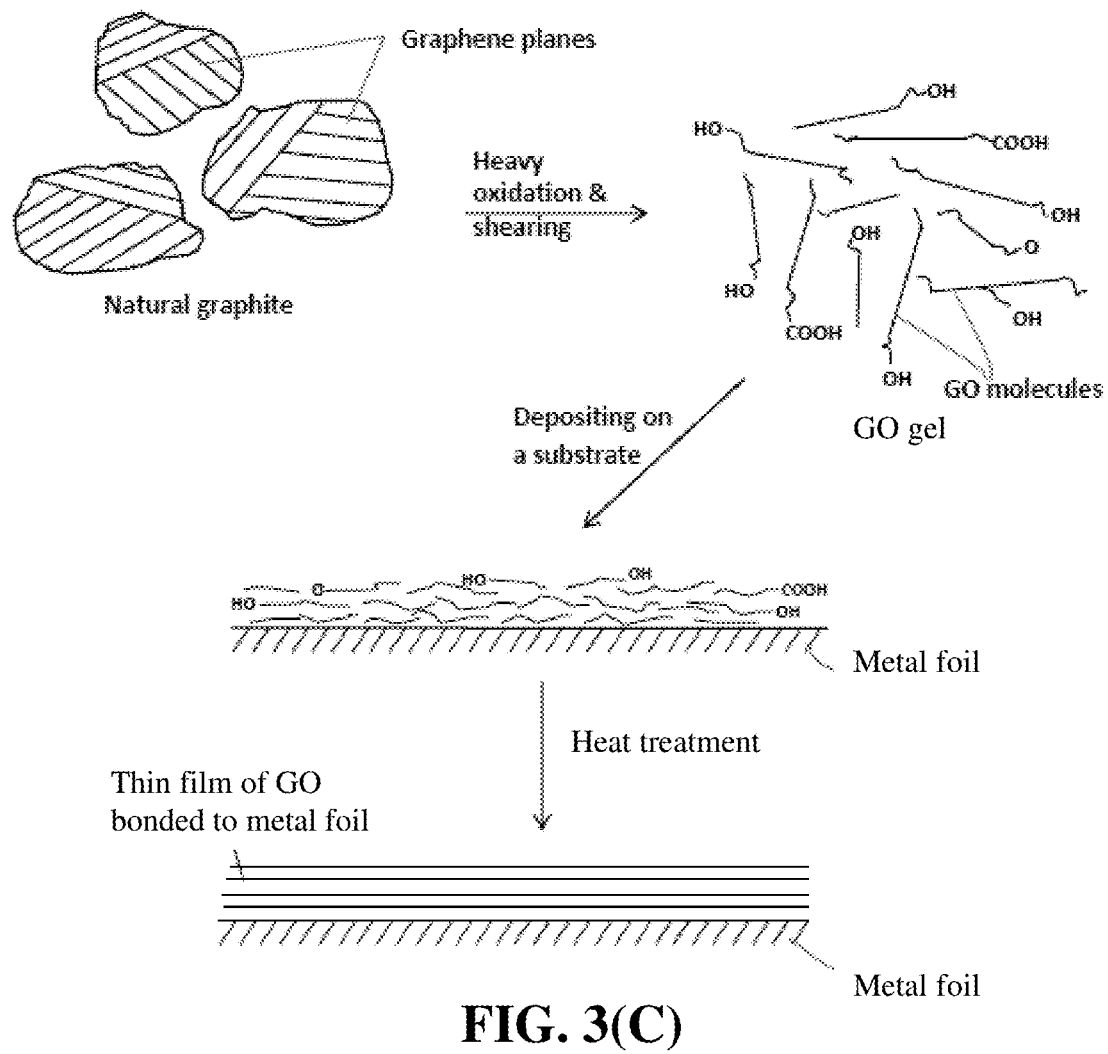
FIG. 3(C) Schematic drawing to illustrate the formation process of an integral GO entity composed of multiple graphene planes that are parallel to one another and are chemically linked in the graphene plane directions and also bonded in the thickness-direction or crystallographic c-axis direction.
Figure 3D:
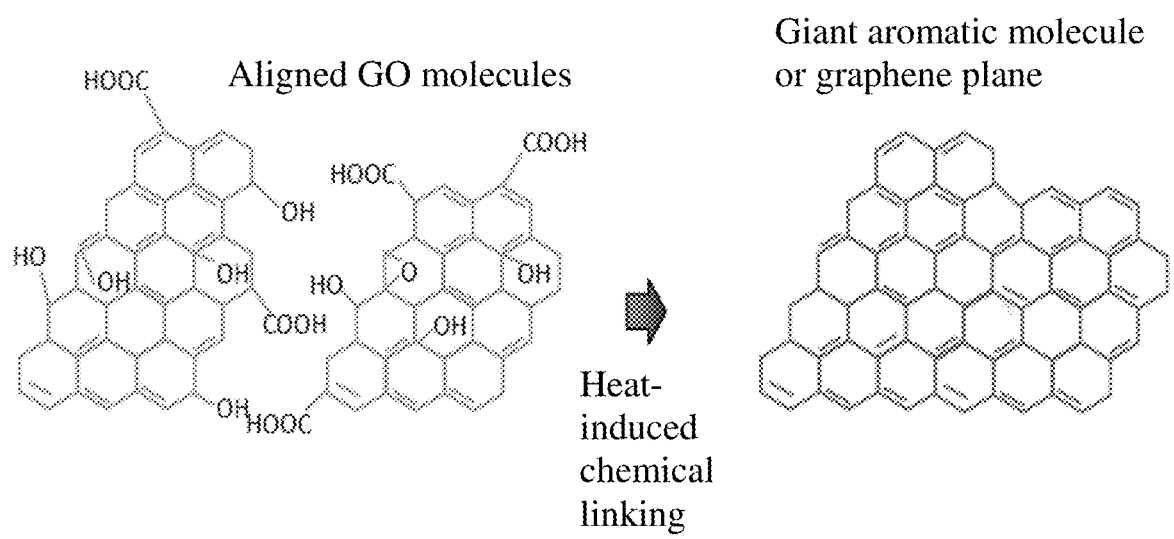
FIG. 3(D) One plausible chemical linking mechanism (only 2 GO molecules are shown as an example; a large number of GO molecules can be chemically linked together to form a large graphene domain).

FIG. 3(A) indicates that the graphene layers in a monolithic GO thin film produced from a coating-based process are substantially oriented parallel to one another; but this is not the case for flexible graphite foils and graphene oxide paper (FIG. 3(B)). The inclination angles between two identifiable layers in the GO thin film entity are mostly less than 5 degrees. The unitary graphene entity is essentially gap-free. In contrast, there are so many folded graphite flakes, kinks, and mis-orientations between graphene platelets in NGP paper (FIG. 3(B)).

Figure 4:
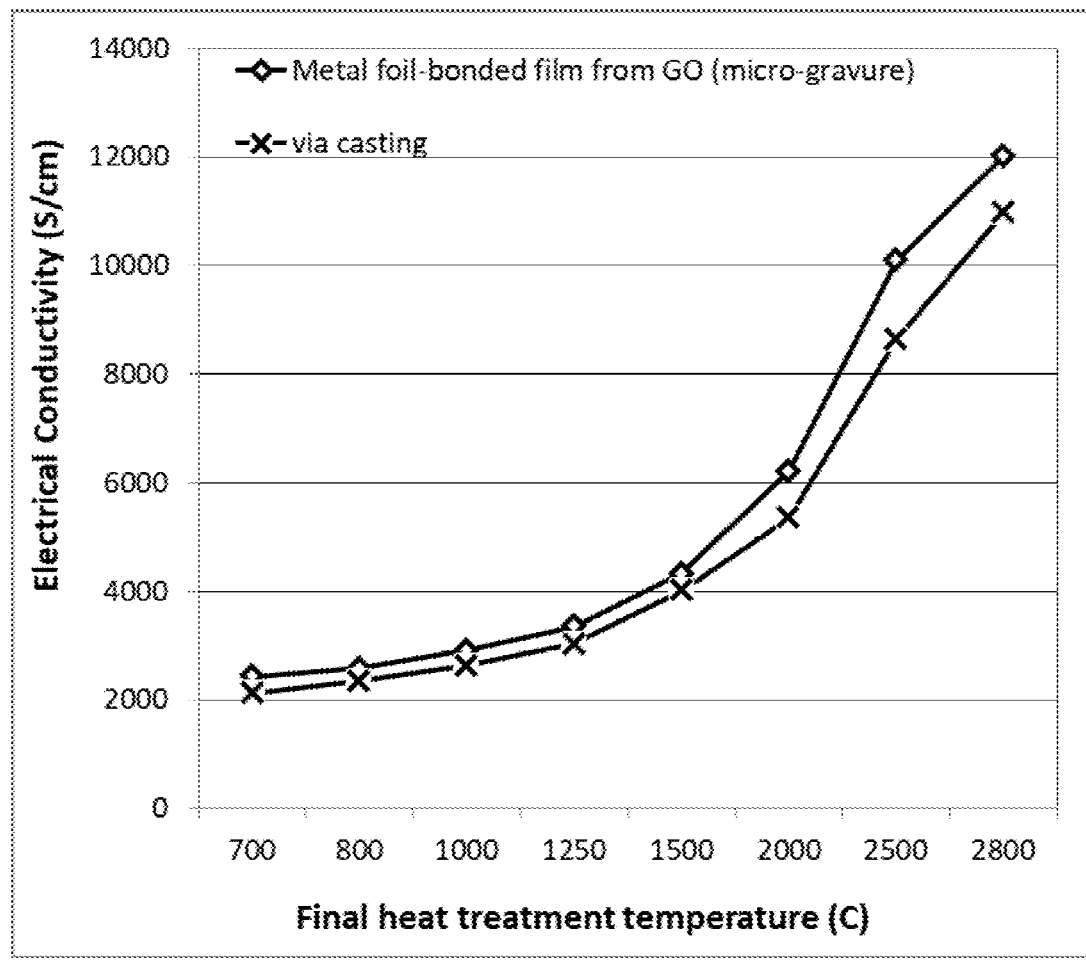
FIG. 4 Electric conductivity values of the GO-derived graphene layer prepared by micro-gravure coating and those of a layer prepared via casting.

FIG. 4 shows the electric conductivity values of the GO film prepared via micro-gravure are superior to those of the GO film prepared via casting over the entire range of final HTTs investigated. These data have clearly demonstrated the superiority of the GO thin film produced by micro-gravure coating in terms of the achievable thermal conductivity at a given heat treatment temperature.

Example 8: Li—S Cell Containing a Graphene Oxide-Bonded Metal Foil Current Collector at the Anode and at the Cathode Two (3) Li—S cells were prepared and tested, each one having a lithium foil as the anode active material, a sulfur/expanded graphite composite (75/25 wt. ratio) as the cathode active material, 1M of $LiN(CF_3SO_2)_2$ in DOL as the electrolyte, and a Celgard 2400 as the separator. The first cell (a baseline cell for comparison) contains a 10-μm thick Cu foil as the anode current collector and a 20-μm thick Al foil as the cathode current collector. The second cell has a GO-bonded Cu foil (totally 12-μm thick) of the present disclosure as the anode current collector and a sheet of a 20-μm thick GO-coated Al foil as the cathode current collector, prepared from micro-gravure coating process.

Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, and the binder, but excluding the current collectors). The specific energy and specific power values presented in this section are based on the total cell weight (including anode and cathode, separator and electrolyte, current collectors, and packaging materials). The morphological or micro-structural changes of selected samples after a desired number of repeated charging and recharging cycles were observed using both transmission electron microscopy (TEM) and scanning electron microscopy (SEM).

Figure 5:
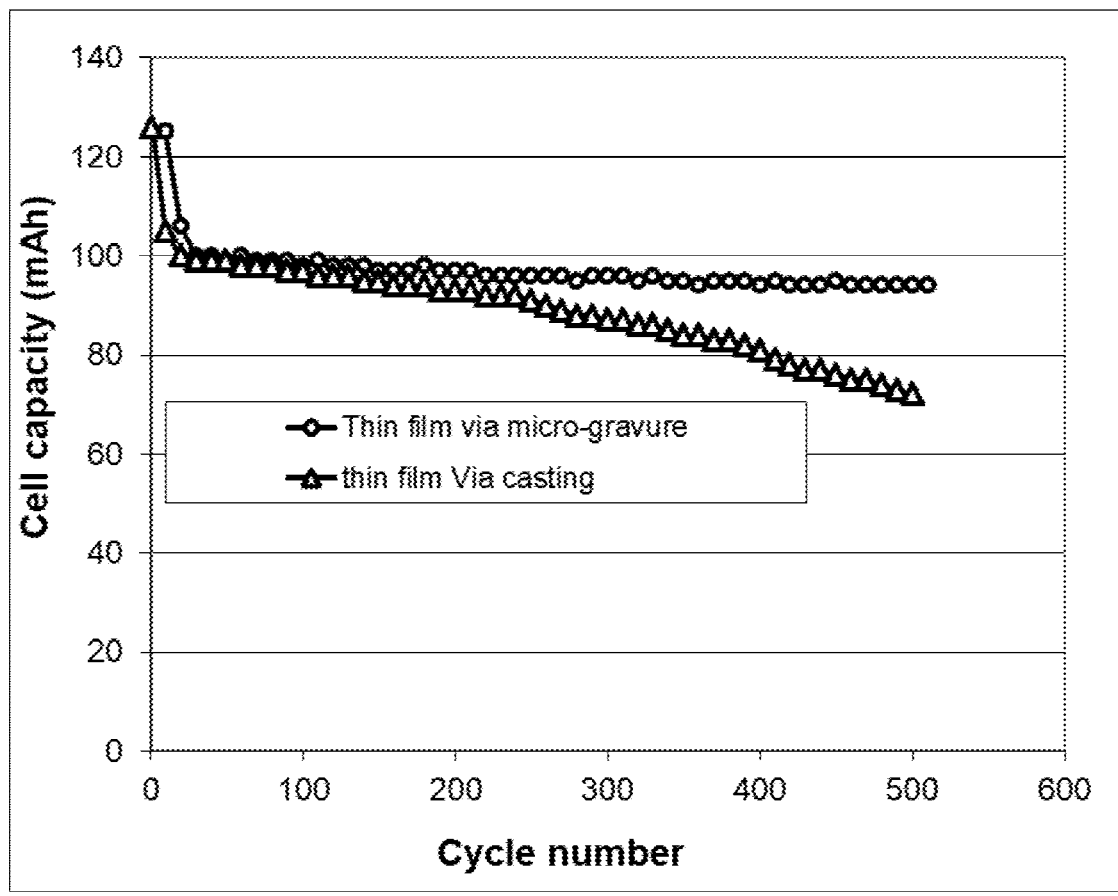
FIG. 5 The discharge capacity values of two Li—S cells each as a function of the charge/discharge cycle number; first cell having graphene-bonded Cu foil and graphene-bonded Al foil as the anode and cathode current collectors, respectively; second cell having a Cu foil anode current collector and Al foil cathode current collector (a prior art cell).

FIG. 5 shows the discharge capacity values of the three cells each as a function of the charge/discharge cycle number. Each cell was designed to have an initial cell capacity of 125 mAh to facilitate comparison. It is clear that the Li—S cell featuring the presently invented GO-bonded current collector at both the anode and the cathode, prepared via micro-gravure process, exhibits the most stable cycling behavior, experiencing a capacity loss of 6.1% after 510 cycles. The cell containing a Cu foil anode current collector and an Al foil cathode current collector suffers from a 27% capacity decay after 510 cycles. Post-cycling inspection of the cells indicate that Al foil in all prior art electrodes suffered a severe corrosion problem. In contrast, the presently invented graphene oxide-bonded Al current collectors remain intact.

Example 9: Chemical and Mechanical Compatibility Testing of Various Current Collectors for Various Intended Batteries or Supercapacitors As demonstrated in Examples 8 above, long-term stability of a current collector relative to the electrolyte of a battery or supercapacitor is a major concern. In order to understand the chemical stability of various current collectors, a major task was undertaken to expose current collectors in several representative electrolytes. After an extended period of time (e.g. 30 days), the current collector was removed from the electrolyte solution and observed using optical and scanning electron microscopy (SEM). The results are summarized in Table 3 below, which consistently demonstrate that the inventive graphene-bonded metal foil current collectors are highly compatible with all kinds of liquid electrolytes commonly used in batteries and supercapacitors. The inventive materials are resistant to any chemical attack. These graphene-protected current collectors are essentially electrochemically inert over a voltage range of 0-5.5 volts Vs. $Li/Li^+$, suitable for use with just about any battery/capacitor electrolyte.

It may be noted that each current collector must be connected to a tab that is, in turn, connected to an external circuit wire. The current collector must be mechanically compatible with the tab, being readily or easily fastened or bonded thereto. We have found that CVD graphene films just cannot be mechanically fastened to the tab without being easily broken or fractured. Even with the assistance of adhesive, the CVD film is easily fractured during the procedures of connecting to a tab or battery cell packaging.

TABLE 3

Results of current collector-electrolyte compatibility testing.

| Sample No. | Intended battery or supercapacitor | Current collector | Electrolyte | Observations |
|---|---|---|---|---|
| Li-1A | Li-ion or Li metal | GO film-bonded Cu foil | 1M $LiPF_6$ in PC + DME | Remains intact, no swelling, no micro-cracking; no pits. |
| Li-1B | Li-ion or Li metal | CVD graphene film | 1M $LiPF_6$ in PC + DME | Micro-cracks formed along grain boundaries |
| Li-1C | Li-ion or Li metal | RGO coated on PET film | 1M $LiPF_6$ in PC + DME | RGO layer swollen, delamination from PET film |
| Na-1A | Na-ion or Na metal | GO film-bonded Ti foil | 1M $NaClO_4$ in DOL + DEC | Remains intact, no swelling, no micro-cracking |
| Na-1B | Na-ion or Na metal | CVD graphene film | 1M $NaClO_4$ in DOL + DEC | Micro-cracks formed along grain boundaries |
| Sup-1A | Supercapacitor or hybrid | Graphene-bonded Al foil | 1M $H_2SO_4$ in water | Remains intact, no swelling, no micro-cracking |
| Sup-1B | Supercapacitor or hybrid | Flexible graphite foil | 1M $H_2SO_4$ in water | Severely swollen, flaking (graphite flakes coming off) |
| Sup-1C | Supercapacitor or hybrid | Graphene-bonded Al foil | Alkylammonium in acetonitrile | Remains intact, no swelling, no micro-cracking, no pitting corrosion |
| Sup-1D | Supercapacitor or hybrid | Carbon-coated Al | Alkylammonium in acetonitrile | Corrosion of Al layer; some carbon flaking |
| Zn-1A | Zinc-air | GO film-bonded Ni foil | KOH in water | Remains intact, no swelling, no micro-cracking |
| Zn-1B | Zinc-air | Flexible graphite foil | KOH in water | Severely swollen, flaking |

In conclusion, we have successfully developed a new, novel, unexpected, and patently distinct class of highly conducting material: graphene-bonded on metal foils. The chemical composition, structure (crystal perfection, grain size, defect population, etc.), crystal orientation, morphology, process of production, and properties of this new class of materials are fundamentally different and patently distinct from flexible graphite foil, polymer-derived pyrolytic graphite, CVD-derived PG (including HOPG), and catalytic CVD graphene thin film that are free-standing or coated on a metal foil. The thermal conductivity, electrical conductivity, scratch resistance, surface hardness, and tensile strength exhibited by the presently invented materials are much higher than what prior art flexible graphite sheets, paper of discrete graphene/GO/RGO platelets, or other graphitic films could possibly achieve.

The invention claimed is:

1. A process for producing a thin film graphene-bonded metal foil current collector for a battery or supercapacitor, said process comprising: (a) providing a graphene suspension comprising graphene sheets dispersed in a liquid medium, wherein said graphene sheets comprise sheets of a graphene material selected from pristine graphene, graphene fluoride, graphene chloride, graphene bromide, graphene iodide, hydrogenated graphene, nitrogenated graphene, doped graphene, chemically functionalized graphene, or a combination thereof; (b) operating a gravure or micro-gravure coater to deposit a layer of said graphene suspension onto at least one of two primary surfaces of a metal foil to form a wet layer of graphene deposited thereon; and (c) removing said liquid medium from the deposited wet layer to form a dry layer of graphene, having a layer thickness from 1 nm to 1000 nm, wherein the metal foil is Cu, Ni, stainless steel, Ti, or Al foil; further including a procedure of chemically etching said at least one of two primary surfaces of the metal foil to remove a surface-borne passivating layer prior to (a).

2. The process of claim 1, wherein the process includes heat treating the dry layer of graphene at a temperature from 35° C. to 3,000° C.

3. The process of claim 1, wherein the dry layer of graphene has a layer thickness from 2 nm to 100 nm.

4. The process of claim 1, wherein (b) includes depositing the layer of said graphene suspension on each of said two primary surfaces, wherein said metal foil has a thickness from 1 μm to 30 μm.

5. The process of claim 1, wherein said graphene suspension has a viscosity from 500 centipoise to 500,000 centipoise when measured at 20° C.

6. The process of claim 1, wherein said graphene suspension further comprises an adhesive and said (c) comprises polymerizing, crosslinking, or activating the adhesive to produce chemical bonding between said graphene sheets and said metal foil.

7. The process of claim 1, which is a roll-to-roll process wherein said (b) and (c) include feeding a sheet of said metal foil from a roller to a deposition zone, depositing said layer of said graphene suspension onto said at least one of two primary surfaces of said metal foil to form said wet layer of graphene thereon, drying said wet layer of graphene to form said dry layer of graphene deposited on said at least one of two primary surfaces, and collecting said thin film graphene-bonded metal foil current collector on a collector roller.

8. The process of claim 1, wherein said metal foil is porous containing surface pores or interior pores.

9. The process of claim 2, wherein (c) comprises a procedure of peeling off the dry layer of graphene prior to heat treating the dry layer of graphene at the temperature from 35° C. to 2,500° C. and a subsequent procedure of bonding the dry layer of graphene to said metal foil.

* * * * *